(12) United States Patent
Giles et al.

(10) Patent No.: US 6,323,843 B2
(45) Date of Patent: Nov. 27, 2001

(54) COMPUTER MOUSE

(75) Inventors: Susan L. Giles, 739 Nevada Ave., San Mateo, CA (US) 94402; Patrick A. Mavrakis, Newark, CA (US); George V. Anastas, San Carlos, CA (US)

(73) Assignee: Susan L. Giles, San Mateo, CA (US)

( * ) Notice: Subject to any disclaimer, the term of this patent is extended or adjusted under 35 U.S.C. 154(b) by 0 days.

(21) Appl. No.: 09/738,642

(22) Filed: Feb. 20, 2001

Related U.S. Application Data

(63) Continuation-in-part of application No. 09/113,035, filed on Jul. 9, 1998, now abandoned.

(51) Int. Cl.[7] .................................................. G09G 5/00
(52) U.S. Cl. .................................................. 345/163
(58) Field of Search ................................... 345/163–166, 345/156, 157, 158; 74/471 XY; 200/11 R, 5 A

(56) References Cited

U.S. PATENT DOCUMENTS

| | | | |
|---|---|---|---|
| 5,570,112 | * 10/1996 | Robinson | 345/163 |
| 5,870,081 | * 2/1999 | Wu | 345/163 |
| 5,912,661 | * 6/1999 | Siddiqui | 345/166 |
| 6,275,215 | * 8/2001 | Kim | 345/163 |

* cited by examiner

Primary Examiner—Richard Hjerpe
Assistant Examiner—Francis Nguyen
(74) Attorney, Agent, or Firm—Dergosits & Noah LLP

(57) ABSTRACT

An improved mouse computer input device is provided which can easily be controlled by both the small hands of children and the larger hands of adults. The mouse is substantially hemispherical in shape and the buttons of the mouse curve in a continuous arc from substantially horizontal at the top area to substantially vertical at the front area. The buttons of the mouse are activated by either squeezing the front vertical surfaces of the buttons or pressing downward on the top horizontal surfaces of the buttons.

18 Claims, 7 Drawing Sheets

COMPUTER MOUSE

This is a continuation-in-part of pending prior U.S. application Ser. No. 09/113,035 filed July 9, 1998 now abandoned.

FIELD OF THE INVENTION

This invention is related to an electromechanical mouse input device for a computer.

BACKGROUND OF THE INVENTION

Mouse input devices for computers are well known in the art. The movement of the mouse in an X-Y plane typically actuates a mechanical, optical or electrical device within the mouse which produces X and Y position signals which are conveyed to the computer. The computer typically uses the mouse X and Y position signals to manipulate the display of the computer screen, allowing a user to control a program. Computer mice also typically have one or more buttons which allow the user to further control a computer program. The mouse and mouse button allow the user to move a cursor or other pointing device to a specific area of the computer screen and depress the one or more buttons to activate specific computer program functions. In general, the mouse buttons are actuated by pressing the button downward.

With the proliferation of home and school computers, people are becoming computer literate at earlier ages. Software companies are developing educational programs for use by young children. These programs require children to operate a computer mouse.

One of the problems associated with computer mice is that children have great difficulty with the combined action of positioning the mouse in the required x-y coordinate while at the same time operating the one or more buttons. Computer mice are typically designed for adult hands with buttons designed for adult fingers. When the adult mouse is used by small children, the movement and button activation can be very difficult.

The prior art has attempted to make mice more user friendly, however these designs are generally designed to reduce hand injuries including carpal tunnel syndrome. Examples of Ergonomic mice include: U.S. Pat. Nos. 5,726, 683 and 5,576,733 which both provide mouse bodies shaped for a more natural user hand position. Although these inventions address the problem of repetitive stress for adult hands, they do not aid children with the use of mice. Specifically, the prior art has not designed a mouse specifically sized for children's hands and which minimizes the coordination requirements of positioning the mouse while at the same time activating the button. In particular, children have problems actuating the buttons of an adult computer mouse.

In view of the foregoing, what is needed is a computer mouse that allows small hands to easily actuate the buttons and that can also be easily used by larger adult hands.

SUMMARY OF THE INVENTION

The present invention is a child's computer mouse for controlling a cursor and inputting information into a computer. The inventive computer mouse includes an internal position detection mechanism and one or two buttons that electrically actuate features of a computer program. The mouse body is substantially hemispherical in shape and the buttons are mounted adjacent to each other on a front portion of the mouse. The buttons are curved downward from the top to the front. The buttons are attached to hinges that are close to the top of the buttons. The curved shape allows the buttons to be actuated by either squeezing the mouse or by applying a downward force on the buttons.

Because the inventive mouse is smaller in size and substantially hemispheric shape that is more easily controlled by a child. The small hemispheric shape of the inventive mouse allows the child to manipulate the mouse position by gripping it and the curved shape of the button allows the button to be actuated by squeezing the mouse.

DESCRIPTION OF THE PREFERRED EMBODIMENT

Figure 1:
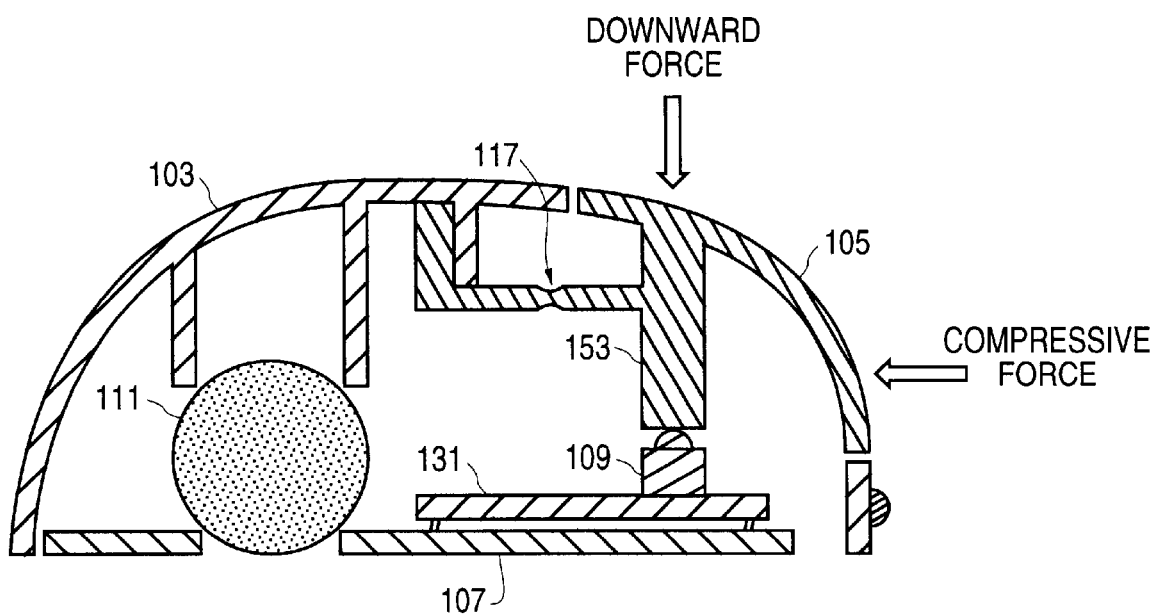
FIG. 1 is a cutaway left side view of an embodiment of the inventive mouse.

The following is a detailed description of the presently preferred embodiments of the present invention. However, the present invention is in no way intended to be limited to the embodiments discussed below or shown in the drawings. Rather, the description and the drawings are merely illustrative of the presently preferred embodiments of the invention.

The mouse produces X and Y position signals that are related to the movement of the mouse as well as signals indicating that either of two switches are activated. A cut away left side view of the exemplary inventive mouse 101 is shown in FIG. 1. The exemplary mouse 101 comprises: a body 103, a left button 105, a base 107, a left switch 109, a roller ball 111 and a circuit board 131. The left button 105 has a left hinge 117 which is attached to the body 103 and allows the left button 105 to rotate. A rib 153 is mounted under the left button 105 and contacts the left internal switch 109. The left internal switch 109 is mounted on the internal circuit board 131 which is attached to the base 107. The roller ball 111, the left switch 109 and the circuit board 131 are accessible by removing the base 107 from the body 103. The inventive mouse has both a left and a right button which individually rotate about left and right hinges to actuate left and right switches. For simplicity, only the left side button, hinge and switch components are described with reference to FIG. 1.

When the mouse 101 is moved across a surface, the roller ball 111 rotates and position transducers (not shown) mounted proximate to the roller ball 111 convert the X and Y movements of the mouse 101 into electrical signals that are electrically transmitted to a computer through a flexible wire connection. These transducers are conventional and well known to those skilled in the art. In the preferred embodiment, the roller ball 111 is in contact with an X-axis rotational transducer and a Y-axis rotational transducer which are substantially perpendicular to each other. When the roller ball 111 rotates in the X direction, the X-axis rotational transducer transmits an X-axis positional signal to the computer and similarly when the roller ball 111 rotates in the Y direction, the Y-axis rotational transducer transmits a Y-axis positional signal. In alternate embodiments, the roller ball mechanism may be replaced by optical transducers or any similar mechanism which sense the movement of the mouse and convert the movement into electrical signals representing the X and Y position.

An advantage of the inventive mouse is that the small size and hemispherical shape of the mouse allow small hands to cup the mouse and coordinate the mouse movement more easily than a larger conventional mice. The small size also allows the buttons to be activated with a squeezing motion between the user's fingers on the buttons and the palm positioned on the back of the mouse body.

The buttons of the inventive mouse are large and curved downward along the front of the mouse. The left button 105 are attached to the mouse body 103 at a hinge 117 located just below the intersection of the body 103 and button 105 at the top of the mouse 101. The curved shape of the button 105 and the position of the hinge 117 allows the switch 109 to be activated with either a direct downward, a horizontal compressive or a rotational force applied by the user to button 105. As discussed, small hands of children can more easily activate the switch by squeezing the button 105 of the mouse 101 and the button 105 can also be actuated with a downward force like other computer mice designed for adults.

The curved shape of the button 105 and the position of the hinge 115 allow the switches 109 to be activated as described above. The button 105 is mounted on the front of the mouse 101 and is curve downward from the top of mouse 101 about the front and sides. The front portion 104 of the button 105 and the back portion 106 of the body 103 are substantially perpendicular to the base 107. The size of the mouse allows a small hand to be placed over the mouse such that finger tips can rest on the front portion 104 of the buttons 105 and the palm can rest on the back portion 106 of the body 103. With the mouse 101 between the small hand's palm and fingers, a compressive force can be applied to actuate the buttons 105 and switches 109 (not shown). The sides of the mouse 101 are also curved and intersect the base 107 at substantially perpendicular angles. These vertical side surfaces allow a small hand's thumb and fingers to grasp the sides of the mouse 101 which improves the positioning accurately.

The inventive mouse 101 can also be easily used by larger hands. The sides of the mouse body 103 can be grasped between the thumb and the third finger or the little finger and by resting the palm can rest on a planar surface the position of the mouse 101 can be precisely controlled. By holding the mouse 101 as described, the index and middle fingers can rest on the tops of the left button 105 and the right button (not shown). The index and middle fingers can easily actuate the left button 105 and right button by, applying downward forces to the horizontal top sections of the buttons 105. By depressing the top surfaces of the buttons 105, the operation of the inventive mouse 101 is similar to that of a normal adult sized mouse. Because the inventive mouse 101 can be easily used by both adults with normal adult sized hands and children with small hands, the mouse 101 does not have to be changed depending upon the user of the computer.

Figure 2A:
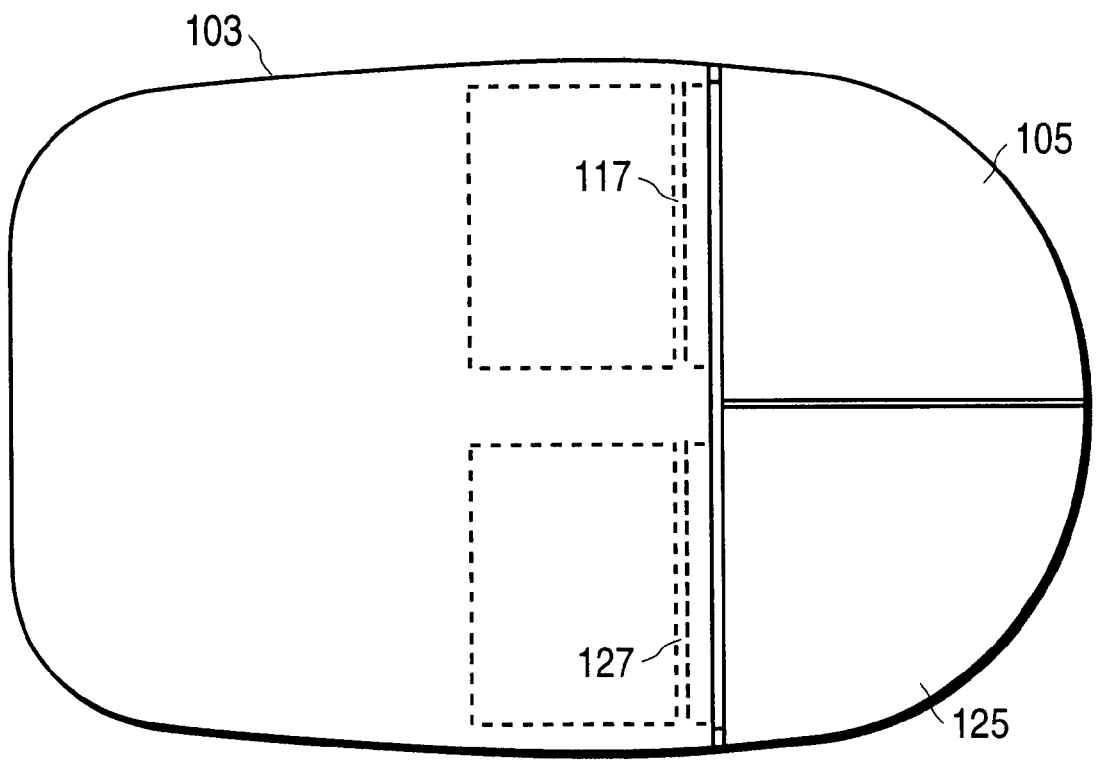
FIG. 2A is a top view of an embodiment of the inventive mouse.

FIG. 2A illustrates a top view of an embodiment of the inventive two button computer mouse 201. A right hinge 127 is mounted close to the intersection of the right button 105 and the mouse body 103. The left hinge 117 is similarly mounted close to the intersection of the left button 105 and the mouse body 103. The right button 125 and right hinge 127 are functionally the same as the left button 105 and left hinge 117 but operate independently.

Figure 2B:
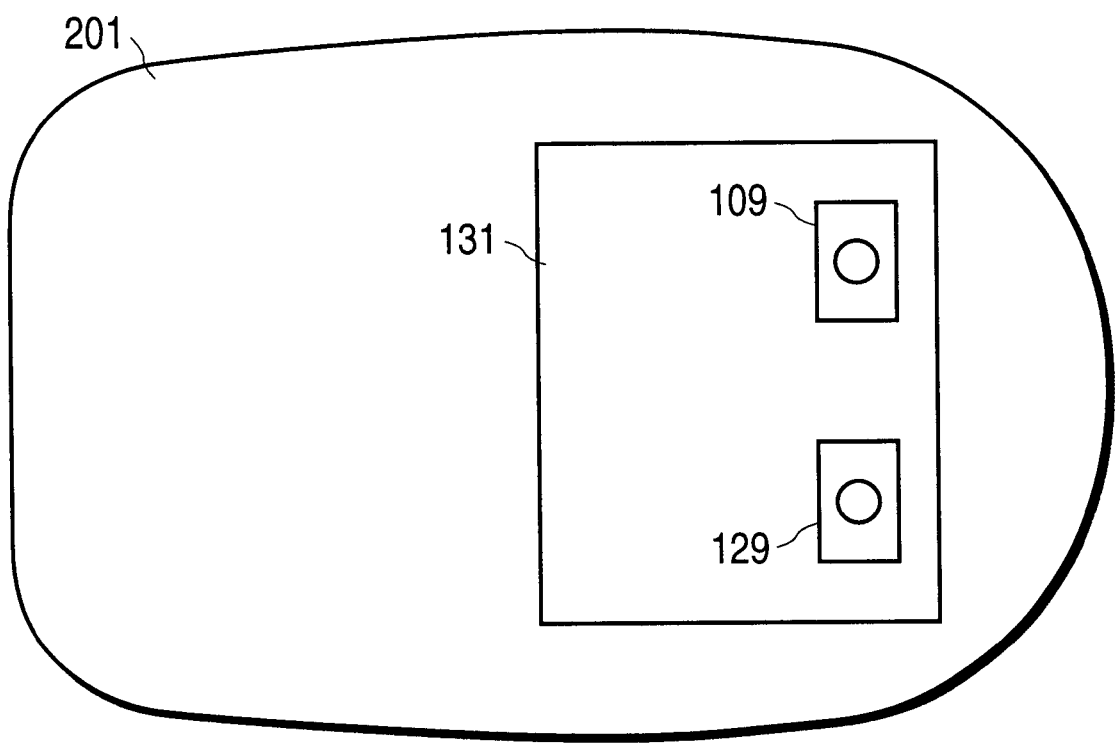
FIG. 2B is a cutaway top view of an embodiment of the inventive mouse.

FIG. 2B illustrates a cutaway top view an embodiment of the inventive computer mouse 201. Both the left switch 109 and the right switch 129 may be mounted on a common circuit board 131. The right switch 129 is functionally identical to the left switch 109 but produce independent signals that are distinct from each other. The switches 109, 129 used in the mouse 201 are well known to those skilled in the art.

As discussed, when the left button 105 is actuated the left switch 109 transmits an electrical signal to a computer through a flexible wire connection and when the right button 125 (shown in FIG. 2A) is actuated the right switch 129 transmits an electrical signal. When no force is applied to the button 105 (shown in FIG. 2A), the internal switches 109 resets and another signal is electrically transmitted to the computer. In alternative embodiments, the flexible wire transmission connection between the mouse and computer may be replaced by a light wave transmitter/receiver, radio frequency transmitter/receiver or any similar mechanism which are well known to those of ordinary skill in the electronics art.

Figure 3:
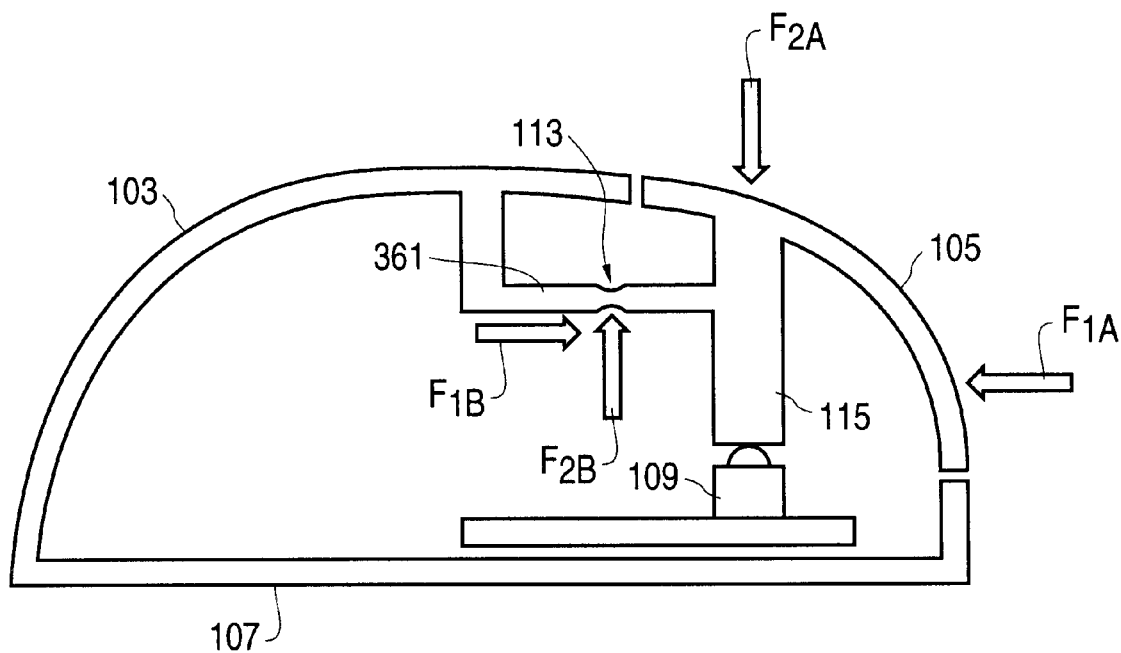
FIG. 3 is a cutaway left side view of an embodiment of the inventive mouse.

FIG. 3 illustrates a cross sectional left side view of the inventive mouse 101 and the forces that may be applied to the mouse 101 to actuate the buttons 105. For simplicity the left button 105, left hinge 113 and left switch 109 will simply be referred to as button 105, hinge 113 and switch 109. In order for the button 105 to rotate about the hinge 113 when the mouse 101 is squeezed, the hinge 113 must be positioned higher within the mouse body 103 than the front portion 104 of the button 105. When a horizontal force $F_{1A}$ is applied to the front portion 104 of the button 105, an equal and opposite horizontal force $F_{1B}$ exists at hinge 113. Because the forces $F_{1A}$ and $F_{1B}$ are not on the same vertical plane, a torque is generated that actuates the button 105. The torque produced by squeezing the button 105 is equal to the compressive force multiplied by the vertical distance between the hinge and the horizontal force $F_{1A}$. In the preferred embodiment, the hinge 113 is mounted close to the top of the mouse 101, maximizing the front portion 104 of button 105 upon which a compressive force will generate a clockwise torque about hinge 113.

As shown in FIG. 3, for a downward force $F_{2A}$ to rotate button 105 clockwise, the hinge 113 must be mounted between the button 105 and the back portion 106 of the mouse 101. Again, when a downward force $F_{2A}$ is applied to the top portion 108 of button 105, an equal and opposite force $F_{2B}$ will exist at the hinge 113. Because the forces $F_{2A}$ and $F_{2B}$ are offset, a torque is generated equal to the force $F_{2A}$ multiplied by the horizontal offset between the hinge 113 and the downward force $F_{2A}$. Note that any force substantially normal to the surface of button 105 will produce a similar torque about the hinge 113.

The relative positions of the hinge 113 about which button 105 rotates and the junction of the internal switch 109 and the button 105 must be configured in such a way that either a downward force or a compressive force applied to the button 105 activates the internal switch 109. The curved surface of button 105 allows a force to be exerted upon it at a range of angles. Thus, a downward force at the upper horizontal portion of the button 105 will actuate the internal switch 109 and a horizontal compressive force against the front vertical portion of the button 105 will actuate the internal switch. Similarly, a diagonal force applied to the center sloped section of the button 105 will actuate the internal switch 109. Any force exerted upon the button 105 that is roughly perpendicular to the button 105 surface will actuate the switch 109.

In the preferred embodiment, the hinge 113 and rib 115 are integral parts of the left and right button 105 and may be made out of a single piece of molded plastic. The hinge 113 is a tapered section of planar piece of plastic 361 which can elastically deflects allowing the button 105 to rotate when a force is applied to the button 105. As discussed, the rib 115 under the button 105 rests on switch 109. When the button 105 rotates about the hinge 115 by either the application of a downward or compressive force, the rib 115 depresses the switch 109 and the hinge 113 elastically deflects. When the force is released from the button 105 the hinge 113 assumes its normal straight position and the switch 109 is deactuated. Because plastic elastically deflects, the hinge 113 acts as a reset spring which tends to return to its normal straight position when no forces are acting on it. When button 105 is released, the internal spring (not shown) of the switch 109 also pushes rib 115 up and rotate button 105 counter-clockwise about the hinge 113 into a normal position.

Figure 4:
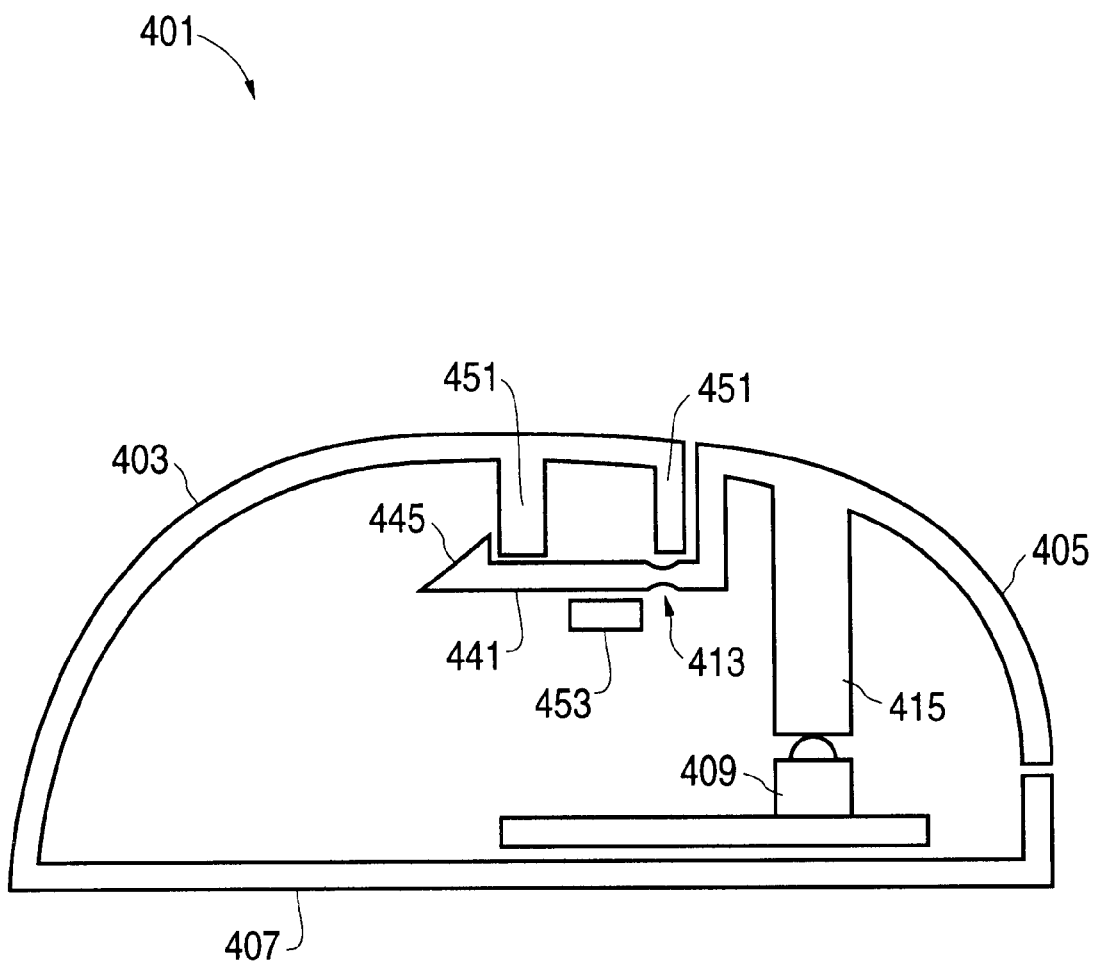
FIG. 4 is a cutaway left side view of an embodiment of the inventive mouse.

FIG. 4 illustrates another cross sectional view of the right side of the inventive mouse 401 in another embodiment. Again for simplicity, the left button 105, left hinge 113 and left switch 109 will simply be referred to as button 405, hinge 413 and switch 409. To simplify assembly of the mouse 401, the button 405 may snap into the final assembled engagement with the body 403. As discussed, the hinge 413 may be an integral part of the button 405. In the preferred embodiment, a tab 441 having a hook 445 is attached to the distal end of the hinge 413 which is inserted into the mouse body 403 during assembly. The mouse body 403 has an internal ribs 451 and a cross bar 453 that engage the tab 441. The hook 445 engages one of the internal ribs 451 and prevents the button 405 from being removed from the mouse body 403 after the mouse 401 is assembled. The button 405 is attached to the mouse body 403 by inserting the tab 441 horizontally into the mouse body 403. As tab 441 is inserted over the cross bar 453, the hook 445 contacts internal rib 451 and is deflected downward. When the button 405 is fully inserted and the hook 445 passes the internal rib 451, the hook 445 engages an edge of the internal rib 451 when the elasticity of the plastic material straightens the tab 441. The button 405 butts up against one of the ribs 451 to keep the button 405 properly positioned on the mouse 401 and the engagement of the hook 445 with the internal rib 451 prevents the button 405 from being removed from the mouse 401 after assembly. The mouse 401 illustrated in FIG. 4 has the same external appearance as the prior embodiments and utilizes the disclosed switch configuration. A top view of mouse 401 would be the same as FIG. 2A and a cutaway top view would be the same as FIG. 2B.

Although an elastic plastic hinge is part of the preferred embodiment, any other hinge or deflection device can be used with the inventive mouse. If a multiple piece hinge is used, it may not act as a reset spring and only the internal spring (not shown) of switch will rotate button into its normal position. In alternative embodiments, an internal springs may be incorporated into the mouse body which reset the buttons when an actuation forces is not applied to the buttons.

Figure 5:
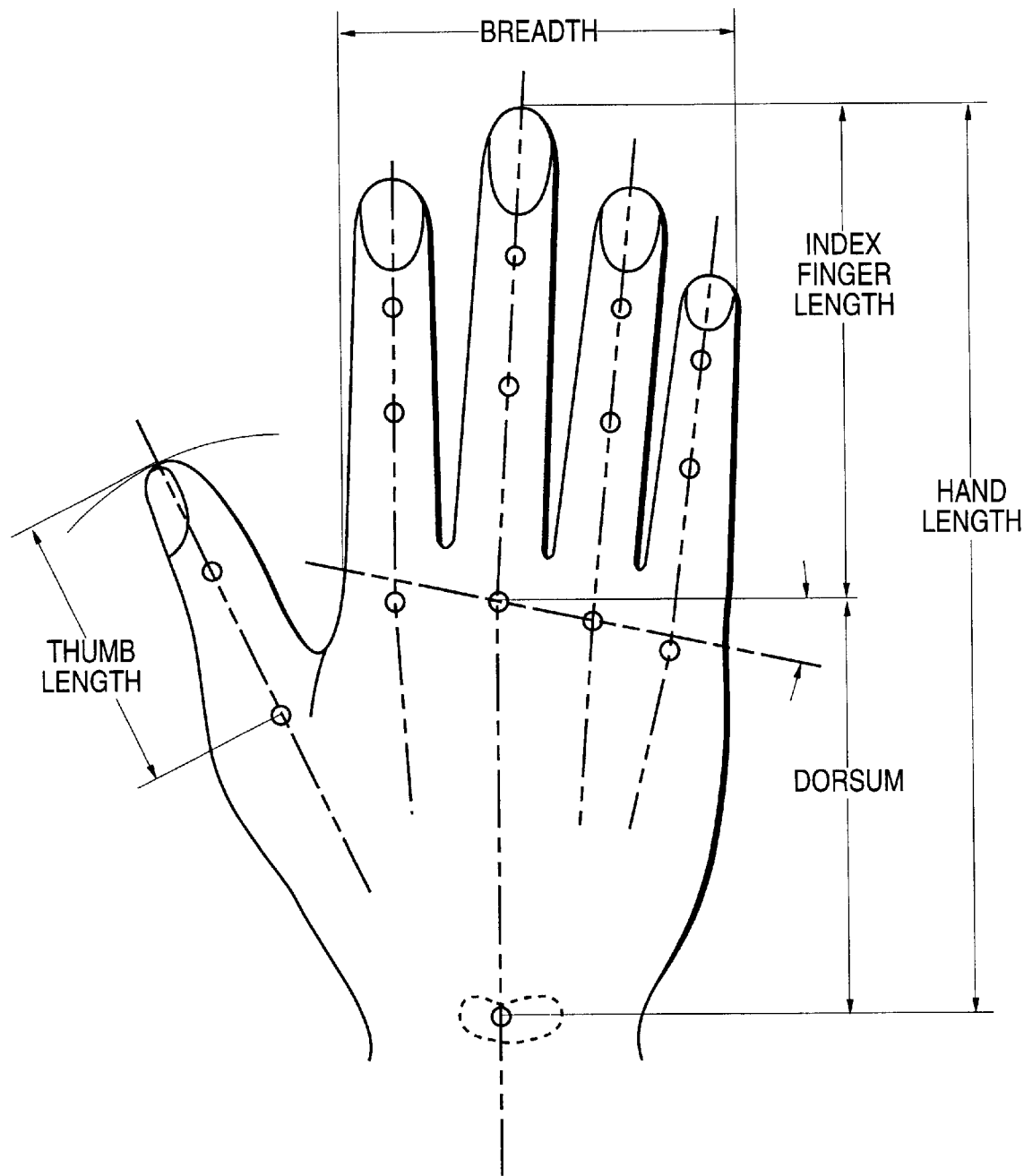
FIG. 5 is a view of a hand.

As discussed, the inventive mouse is substantially hemispherical in shape and small in size which allows children and users with small hands to cup and more precisely position the mouse. In the preferred embodiment, the overall inventive dimensions of the mouse should be proportional to the average sized child's hand. Table 1 lists average dimensions of various hand parameters of children 4, 6 and 8 years of age. Table 1 also lists the average dimensions of an adult hand for comparison. Note that the dimensions of the adult male hand are approximately 68%, 48% and 35% greater than average 4, 6 and 8 year old children's hands respectively. The hand dimensions of Table 1 are inches. FIG. 5 illustrates where the listed dimensions are measured on a hand.

TABLE 1

|  | 4 year old child | 6 year old child | 8 year old child | Adult male |
| --- | --- | --- | --- | --- |
| Hand length | 4.6 | 5.1 | 5.6 | 7.5 |
| Hand Breadth | 2.1 | 2.3 | 2.5 | 3.5 |
| Index finger length | 2.6 | 2.9 | 3.2 | 4.5 |
| Dorsum length | 1.8 | 2.2 | 2.4 | 3.0 |
| Thumb length | 1.6 | 1.8 | 2.0 | 2.7 |

In order to accommodate the smaller dimensions of children's hands, the size of the inventive mouse must be proportionally smaller than an adult mouse. The length of the inventive mouse is approximately 3.5 inches and the width is approximately 2.3 inches. In contrast, a typical adult mouse is approximately 4.8 inches in length and approximately 2.7 inches in width. The inventive mouse is easier for a child to precisely position because it is a better fit with the child's hand.

Figure 6:
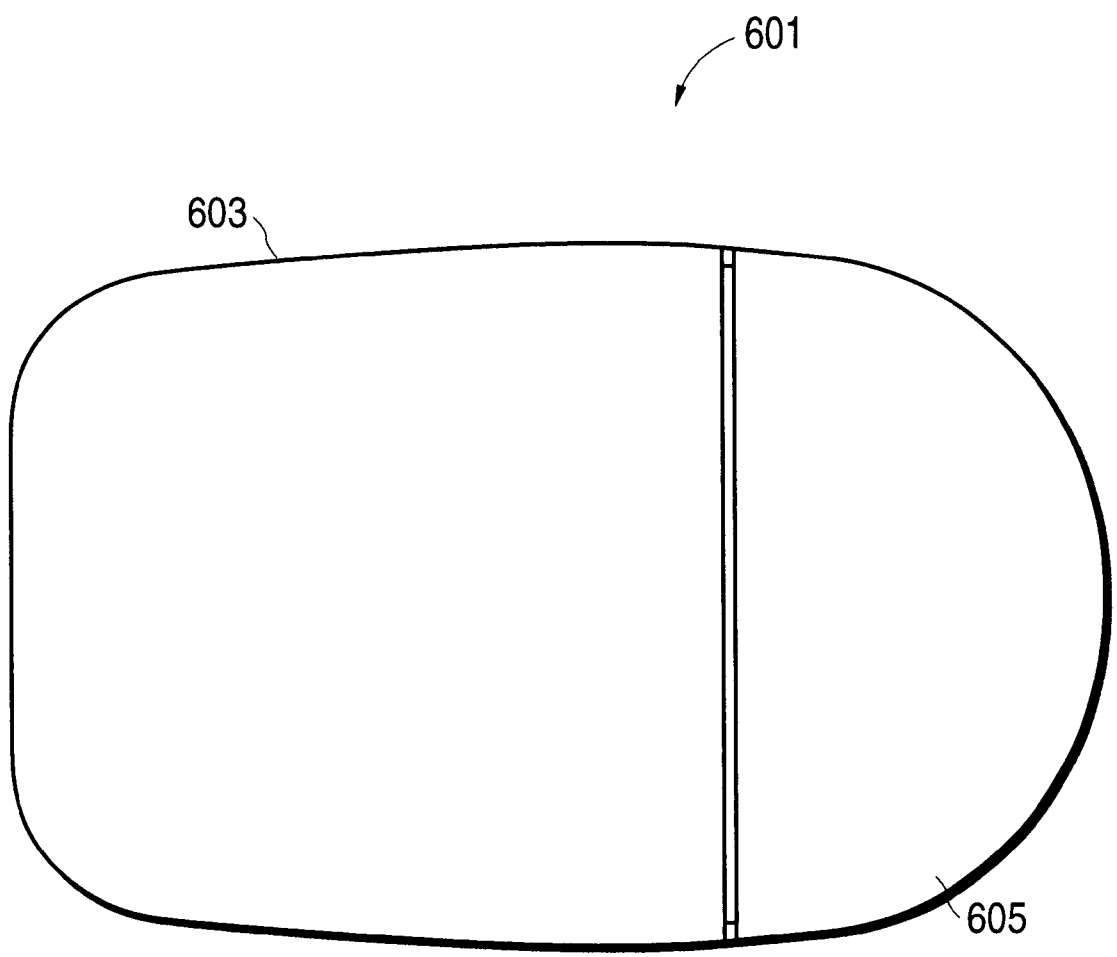
FIG. 6 is a top view of a single button embodiment of the inventive mouse.

FIG. 6 illustrates a top view of a single button embodiment of the inventive mouse 601. The mouse 601 has a body 603 and a button 605. The button 605 has a continuous arc shape that curves from a substantially horizontal surface at the top of the button 605 to a substantially vertical surface at the front of the button 605. The button 605 is mounted to a hinge (not shown) which is attached to the mouse body 603. The button 605 can be actuated by applying a downward force on the upper vertical surface of the button 605 or by applying a compressive force to the front vertical surface of the button 605. The button 605 rotates about the hinge and engages an electrical switch within the body. The single button mouse embodiment operates in the manner described with reference to the two button embodiments.

While the present invention has been described in terms of a preferred embodiment above, those skilled in the art will readily appreciate that numerous modifications, substitutions and additions may be made to the disclosed embodiment without departing from the spirit and scope of the present invention. For example, although the mouse has been described above for use with a computer, those skilled in the art will readily appreciate that the inventive mouse may be utilized in any similar electronic device and that the present invention is in no way limited to mechanisms described above. It is intended that all such modifications, substitutions and additions fall within the scope of the present invention which is best defined by the claims below.

What is claimed is:

1. A mouse input device comprising:
   a body having a bottom surface, a front surface, a top surface and a back surface, the back surface being substantially perpendicular to the bottom surface;
   a hinge mounted within the body proximnate to the top surface of the body;
   a button connected to the hinge which curves along a continuous arc that tansitions from substantially horizontal at the top so to substantially vertical at the front surface of the body; and an electrical switch mechanically coupled to the button, wherein the electric switch is actuated by applying a substantially horizontal compressive force on the substantially vertical portion of the button and by applying a substantially downward force on the substantially horizontal portion of the button.

2. The mouse input device of claim 1, wherein the hinge is located higher within the body than the substantially vertical portion of the button.

3. The mouse input device of claim 1, wherein the hinge is a tapered section of a single planar piece of plastic that elastically deflects when the button is actuated.

4. The mouse input device of claim 1 further comprising:
a button rib mounted within the button that engages the electrical switch.

5. The mouse input device of claim 4, wherein the button, the hinge and the button rib are molded from a single piece of plastic.

6. The mouse input device of claim 5, further comprising:
a planar tab and a hook that are attached to a side of the hinge opposite the button;
a cross bar which defines a horizontal surface within the body; and
a plurality of body ribs which define a plurality of horizontal surfaces within the body;
wherein the cross bar and the plurality of body ribs contact opposite sides of the planar tab and the hook engages an internal edge of one of the plurality of body ribs to prevent removal of the button from the body.

7. The mouse input device of claim 6, wherein the button, the hinge, the rib, the tab and the hook are molded from a single piece of plastic.

8. A mouse input device comprising:
a body having a bottom surface, a front surface, a top surface and a back surface, the back surface being substantially perpendicular to the bottom surface;
a left hinge mounted within the body proximate the upper left surface of the body;
a left button connected to the left hinge which curves along a continuous arc that transitions from substantially horizontal at the top surface to substantialy vertical at the front surface of the body;
a left electrical switch mechanically coupled to the left button which is actuated by applying a substantially horizontal compressive force on the substantially vertical portion of the left button and by applying a substantially downward force on the substantially horizontal portion of the left button;
a right hinge mounted within the body proximate the upper right surface of the body;
a right button connected to the right hinge which curves along a continuous arc that transitions from substantially horizontal at the top surface to substantially vertical at the front surface of the body; and
a right electrical switch mechanically coupled to the right button which is actuated by applying a substantially horizontal compressive force on the substantially vertical portion of the right button and by applying a substantially downward force on the substantially horizontal portion of the right button.

9. The mouse input device of claim 8, wherein the left hinge is located higher in the mouse than the substantially vertical portion of the left button and the right hinge is located higher in the mouse than the substantially vertical portion of the right button.

10. The mouse input device of claim 8, wherein the left hinge is a first tapered section of a single planar piece of plastic that elastically deflects when the left button is actuated.

11. The mouse input device of claim 8 further comprising:
a left button rib mounted within the button that engages the left electrical switch.

12. The mouse input device of claim 8, wherein the left button, the left hinge and the left button rib are molded from a single piece of plastic.

13. The mouse input device of claim 12, further comprising:
a left planar tab and a left hook that are attached to a side of the hinge opposite the left button;
a cross bar mounted which defines a horizontal surface within the left side of the body; and
a plurality of body ribs which define a plurality of horizontal surfaces within the left side of the body;
wherein the cross bar and the plurality of body ribs contact on opposite sides of the left planar tab and the left hook engages an internal edge of one of the plurality of body ribs to prevent removal of the left button from the body.

14. A mouse input device comprising:
a body having a bottom surface, a front surfaec, a top surface and a back surface, the back surface being substantially perpendicular to the bottom surface;
a hinge mounted within the body proximate to the top surface of the body;
a button connected to the hinge which curves along a continuous arc that transitions from substantially horizontal at the top surface to substantially vertical at the front surface of the body; and
an electrical switch mechanically coupled to the button, wherein the electric switch Is actuated by applying either a substantially horizontal compressive force on the substantially vertical portion of the button or by applying a substantially downward force on the substantially horizontal portion of the button;
wherein the hinge is a tapered section of a single planar piece of plastic that elastically deflects when the button is actuated.

15. The mouse input device of claim 14 further comprising:
a button rib mounted within the button that engages the electrical switch.

16. The mouse input device of claim 15, wherein the button, the hinge and the button rib are molded from a single piece of plastic.

17. The mouse input device of claim 16, further comprising:
a planar tab and a hook that are attached to a side of the hinge opposite the button;
a cross bar which defines a horizontal surface within the body; and
a plurality of body ribs which define a plurality of horizontal surfaces within the body;
wherein the cross bar and the plurality of body ribs contact opposite sides of the planar tab and the hook engages an internal edge of one of the plurality of body ribs to prevent removal of the button from the body.

18. The mouse input device of claim 17, wherein the button, the hinge, the rib, the tab and the hook are molded from a single piece of plastic.

* * * * *